US009978369B2

(12) United States Patent
Abdelsamie et al.

(10) Patent No.: US 9,978,369 B2
(45) Date of Patent: *May 22, 2018

(54) METHOD AND APPARATUS FOR VOICE CONTROL OF A MOBILE DEVICE

(71) Applicant: BlackBerry Limited, Waterloo (CA)

(72) Inventors: Ahmed Abdelsamie, Nepean (CA); Nicholas Shane Choo, Calgary (CA); Guowei Zhang, Kitchener (CA); Omar George Joseph Barake, Waterloo (CA); Steven Anthony Lill, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/593,997

(22) Filed: May 12, 2017

(65) Prior Publication Data

US 2017/0263252 A1    Sep. 14, 2017

Related U.S. Application Data

(63) Continuation of application No. 15/063,160, filed on Mar. 7, 2016, now Pat. No. 9,653,080, which is a
(Continued)

(51) Int. Cl.
*G10L 21/00*    (2013.01)
*G10L 15/26*    (2006.01)
(Continued)

(52) U.S. Cl.
CPC ............ *G10L 15/22* (2013.01); *G10L 15/285* (2013.01); *G10L 2015/223* (2013.01); *H04M 2201/40* (2013.01); *H04M 2250/74* (2013.01)

(58) Field of Classification Search
None
See application file for complete search history.

(56) References Cited

U.S. PATENT DOCUMENTS 5,724,526 A    3/1998   Kunita
5,774,862 A    6/1998   Ho
(Continued)

FOREIGN PATENT DOCUMENTS

| CN | 101957202 A | 1/2011 |
| CN | 102736536 A | 10/2012 |
| WO | 2011097174 A1 | 8/2011 |

OTHER PUBLICATIONS

Chinese Patent Application No. 201410066907.8, Third Office Action dated Jun. 8, 2017—English Translation Not Available.
(Continued)

*Primary Examiner* — Satwant Singh
(74) *Attorney, Agent, or Firm* — Borden Ladner Gervais LLP; Todd Keeler

(57) ABSTRACT

A method and apparatus for voice control of a mobile device are provided. The method establishes a connection between the mobile device and a voice-control module. Responsive to establishing the connection, the mobile device enters into an intermediate mode; and the voice-control module monitors for verbal input comprising a verbal command from among a set of predetermined verbal commands. The voice-control module sends instructions to the mobile device related to the verbal command received; and the mobile device acts on the received instructions. An apparatus/voice control module (VCM) for voice control of a mobile device, wherein the VCM includes a connection module configured for establishing a connection between the VCM and the mobile device; a monitoring module configured for monitoring for a verbal command from among a set of predetermined verbal commands; and a communications module configured for sending instructions to the mobile device related to the verbal command received.

13 Claims, 6 Drawing Sheets

Related U.S. Application Data continuation of application No. 13/778,325, filed on Feb. 27, 2013, now Pat. No. 9,280,981.

(51) Int. Cl.
*G10L 15/22* (2006.01)
*G10L 15/28* (2013.01)

(56) References Cited

U.S. PATENT DOCUMENTS

| | | |
|---|---|---|
| 6,775,697 B1 | 8/2004 | Surazski et al. |
| 6,820,056 B1 | 11/2004 | Harif |
| 7,028,265 B2 | 4/2006 | Kuromusha et al. |
| 7,907,975 B2 * | 3/2011 | Sakamoto ............... H04B 1/385 |
| | | 455/344 |
| 8,165,886 B1 | 4/2012 | Gagnon et al. |
| 8,249,664 B1 | 8/2012 | Bauer et al. |
| 8,270,933 B2 | 9/2012 | Riemer et al. |
| 9,280,981 B2 * | 3/2016 | Abdelsamie ............ G10L 21/00 |
| 9,653,080 B2 * | 5/2017 | Abdelsamie ............ G10L 15/30 |
| 2002/0046033 A1 | 4/2002 | Ono et al. |
| 2007/0202929 A1 | 8/2007 | Satake |
| 2008/0106370 A1 | 5/2008 | Perez et al. |
| 2010/0330908 A1 | 12/2010 | Maddern et al. |
| 2011/0257973 A1 * | 10/2011 | Chutorash .......... G01C 21/3661 |
| | | 704/235 |
| 2011/0294520 A1 | 12/2011 | Zhou et al. |
| 2012/0052907 A1 | 3/2012 | Gilbreath et al. |
| 2012/0214472 A1 | 8/2012 | Tadayon et al. |
| 2012/0244883 A1 | 9/2012 | Tibbitts et al. |
| 2013/0045676 A1 | 2/2013 | Taylor et al. |
| 2013/0297319 A1 * | 11/2013 | Kim ...................... G10L 15/22 |
| | | 704/275 |
| 2013/0322634 A1 * | 12/2013 | Bennett ................ G10L 21/00 |
| | | 381/17 |
| 2013/0322665 A1 | 12/2013 | Bennett et al. |
| 2014/0100740 A1 * | 4/2014 | Chutorash .......... G01C 21/3661 |
| | | 701/36 |
| 2014/0200898 A1 * | 7/2014 | Wischhof ............ B60R 16/0373 |
| | | 704/275 |

OTHER PUBLICATIONS

Canadian Patent Application No. 2,842,061, Examiner's Report dated Jun. 17, 2015.
Canadian Patent Application No. 2,842,061, Examiner's Report dated Jun. 16, 2016.
Chinese Patent Application No. 201410066907.8, Office Action dated Jun. 3, 2016—Without English Translation.
Chinese Patent Application No. 201410066907.8, Second Office Action dated Jan. 23, 2017—English Translation Not Available.
European Patent Application No. 13157062.4, Supplementary European Search Report dated Jun. 14, 2013.
European Patent Application No. 13157062.4, Communication Pursuant to Article 94(3) EPC dated Nov. 17, 2014.
European Patent Application No. 13157062.4, Invitation Pursuant to Article 94(3) and Rule 71(1) dated Jun. 9, 2015.
European Patent Application No. 16168856.9, Extended European Search Report dated Oct. 5, 2016.
U.S. Appl. No. 13/778,325, Final Office Action dated Aug. 4, 2015.
U.S. Appl. No. 13/778,325, Non-final Office Action dated Mar. 12, 2015.
U.S. Appl. No. 13/778,325, Notice of Allowance dated Oct. 28, 2015.
U.S. Appl. No. 15/063,160, Notice of Allowance dated Jan. 12, 2017.
U.S. Appl. No. 15/063,160, Office Action dated Oct. 21, 2016.

* cited by examiner

METHOD AND APPARATUS FOR VOICE CONTROL OF A MOBILE DEVICE

FIELD

The present disclosure relates generally to mobile devices. More particularly, the present disclosure relates to a method and apparatus for voice control of a mobile device.

BACKGROUND

Mobile devices, for example, smart phones, tablet computers, and the like have become heavily used in everyday life. Many users change their behavior to accommodate their mobile device use. As many jurisdictions have enacted laws against use of mobile devices while driving, users wish to have the ability to continue use of the mobile device applications in a hands-free manner.

Typical hands-free systems require users to initiate a hands-free message or call by pressing a button or other activation feature in order to initiate a hands-free mode in which the system is listening for commands. Hands-free mode then allows the user to control the mobile device using voice commands. Generally, mobile devices need to be set to hands-free mode for voice control because, if the mobile device was left in a continuous listening mode, the device could pick up spoken words that are not intended as commands, and also the power requirements of monitoring for voice commands could quickly drain a mobile device's battery. Because of the power requirements, mobile devices will also typically require further user interaction if the hands-free mode is exited or times-out. Therefore, there is a need for an improved method and apparatus for voice control of a mobile device.

SUMMARY

In a first aspect, the present disclosure provides a method for voice control of a mobile device; the method establishes a connection between the mobile device and a voice-control module. Responsive to establishing the connection, the mobile device enters into an intermediate mode; and the voice-control module monitors for verbal input comprising a verbal command from among a set of predetermined verbal commands. Upon receiving a verbal command from among the set of predetermined verbal commands, the voice-control module sends instructions to the mobile device related to the verbal command received; and the mobile device acts on the received instructions.

In some cases, establishing the connection between the mobile device and the voice-control module includes wireless pairing.

In some cases, the mobile device entering the intermediate mode includes disabling at least some predetermined functionality of the mobile device. In some cases, the at least some predetermined functionality includes ability to communicate with one or more predetermined networks and/or the ability to monitor for verbal commands.

In some cases, the set of predetermined verbal commands comprises verbal commands corresponding to communication applications, wherein the communication applications may include at least one of the following: telephone, instant message, voice message, short message service (SMS), multimedia message service (MMS), e-mail message.

The method may also include monitoring at the voice-control module for verbal input including a verbal command further comprises monitoring at the voice-control module for verbal input comprising arguments associated with the verbal command.

The method may further include issuing a prompt, based on an associated argument, for further verbal input at the voice-control module, if the associated argument is a required argument and has not been received.

In some cases, monitoring at the voice-control module for verbal input having arguments associated with the verbal command includes identifying an argument based on a predetermined set of possible responses stored at the voice-control module.

In some cases, the method includes acting on the received instructions at the mobile device including activating an application related to the verbal command.

In some further cases, acting on the received instructions at the mobile device further includes performing an action via the application, based on the verbal command.

In a further aspect, there is provided an apparatus, in this case, a voice control module (VCM), for voice control of a mobile device, the VCM having: a connection module configured for establishing a connection between the VCM and the mobile device; a monitoring module configured for monitoring for verbal input comprising a verbal command from among a set of predetermined verbal commands; and a communications module configured for sending instructions to the mobile device related to the verbal command received.

In some cases, the connection includes wireless pairing between the mobile device and the voice-control module.

In some cases, the set of predetermined verbal commands includes verbal commands corresponding to communication applications, wherein the communication applications comprise at least one of the following: telephone, instant message, voice message, short message service (SMS), multimedia message service (MMS), e-mail message.

In some cases, the monitoring module is further configured to monitor for verbal input including arguments associated with the verbal command.

In some further cases, the monitoring module is further configured to issue a prompt, based on an associated argument, for further verbal input, if the associated argument is a required argument and has not been received.

In some cases, the VCM may include a memory module, and wherein the monitoring module is further configured to identify an argument based on a predetermined set of possible responses stored at the memory module.

In yet another aspect, a mobile device is providing including: a connection module configured for establishing a connection between the mobile device and a voice-control module (VCM); a mode-setting module configured to cause the mobile device to enter an intermediate mode, responsive to establishing the connection; a monitoring module configured for monitoring for instructions received from the VCM; and a processing module configured for executing the received instructions at the mobile device.

In some cases, the connection is a wireless pairing between the mobile device and the VCM.

In some cases, entering the intermediate mode disables at least some predetermined functionality of the mobile device. In some further cases, the at least some predetermined functionality includes ability to communicate with one or more predetermined networks. In some other cases, the at least some predetermined functionality includes ability to monitor for verbal commands.

In some cases, the processing module is configured for executing the received instructions by activating an application related to a verbal command recognized by the VCM and performing an action via the application, based on the verbal command.

According to another aspect herein, there is provided a computer readable medium comprising computer readable code that, when executed on a computer device, perform the method for voice control as described above.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides embodiments of a method and apparatus for voice control of a mobile device. More particularly, the embodiments herein provide for an apparatus, for example, a voice control system or module, establishing a connection with the mobile device, which triggers the mobile device to enter an intermediate mode. The voice control module then monitors for verbal input from a user. On receipt of the verbal input, the voice control module may determine or identify a command phrase issued by the user from the command phrase. A command phrase includes a command and may also include required or optional arguments associated with the command. Once the command phrase has been received, the voice control module transmits instructions to the mobile device to execute the command and, when received, using the associated arguments. Unlike conventional hands-free systems, that still require the user to push a button or otherwise activate a "voice-mode" on the mobile device, the present embodiments are intended to allow for initiating hands-free control of the mobile device without requiring physical input.

Figure 1:
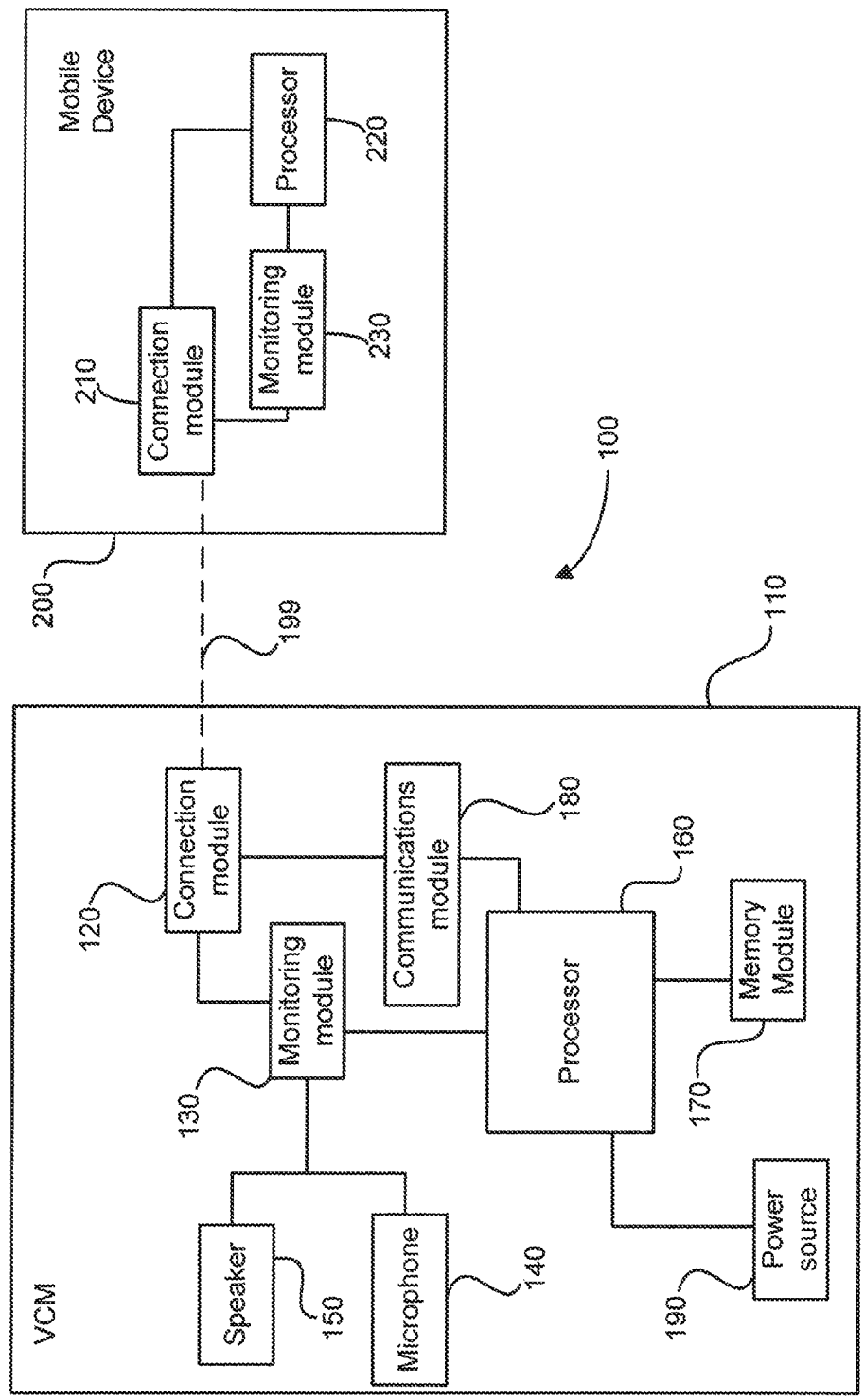
FIG. 1 illustrates an embodiment of a system for voice control.

FIG. 1 illustrates an embodiment of an apparatus or system 100 for voice control. The apparatus 100 for voice control includes a voice control module (VCM) 110 that is configured to connect with a mobile device 200. In particular, the VCM 110 contains a connection module 120 that enables a connection 199 with a corresponding connection module 210 of the mobile device 200. The connection 199 may be a wireless connection, for example, a Bluetooth™ pairing or other connection, as known in the art.

Once a connection 199 is established between the connection module 120 of the VCM 110 and the connection module 210 of the mobile device 200, the mobile device 200 is placed into an intermediate mode. The intermediate mode may be initiated by the VCM 110 sending instructions to the mobile device 200. Alternatively, the mobile device 200 itself may enter the intermediate mode, upon recognizing the connection 199 to the VCM 110. For example, once the connection 199 has been established, the connection module 210 may trigger a processor 220 within the mobile device 200 to enter into the intermediate mode. In the intermediate mode, one or more functions or processes may be disabled, such as, for example, disabling a network connection (not shown) such as a W-Fi™ connection or unneeded Bluetooth™ connection (for example, to a device such as an external keyboard (not shown) or the like), turning off a display screen (not shown), turning off the ability to receive voice commands, and the like. In particular, the intermediate mode may involve disabling functions or processes that are not typically used when in a voice control mode via the VCM 110. The intermediate mode of the mobile device 200 is intended to allow the mobile device to reduce power consumption while still allowing the mobile device to process commands from the VCM 110 or process new events such as receiving a phone call or the like. The processor 220 may be separate from but operatively connected with the connection module 210, or the processor 220 and the connection module 210 may be a single component.

The VCM 110 further includes a monitoring module 130. The monitoring module 130 monitors for verbal input from a user and, as described herein; in particular, it monitors for a command phrase from the user. The monitoring module 130 either includes or is operatively connected to a microphone 140 for receiving verbal input and to a speaker 150 for outputting audio. The user may be able to alter the volume of the microphone 140 and/or the speaker 150 through either the mobile device 200 or the VCM 110.

The monitoring module 130 is further connected to a processor 160. Once the monitoring module 130 detects verbal input from the user, the monitoring module 130 will relay the verbal input to the processor 160. The verbal input may be processed either before or after sending to the processor 160 using various known digital signal processing (DSP) techniques to parse the verbal input.

The processor 160 is operatively connected to a memory module 170, which may be, for example a database. The processor 160 parses the verbal input to determine the command phrase. The command phrase may be parsed to determine the verbal command and any further arguments the user has issued. The processor 160 compares the verbal command to a set of predetermined verbal commands stored within the memory module 170. The set of predetermined verbal commands may include verbal commands corresponding to communication applications, and the communication applications may include at least one of the following: telephone, instant message, voice message, short message service (SMS), multimedia message service (MMS), e-mail message.

A predetermined verbal command may be associated with one or more accompanying arguments, i.e., data that more particularly specifies how that command is to be executed or that consists of communication content to be sent; arguments may be required or optional. For example, a command for a new email may require a recipient and a message and may have optional data, such as a subject, while a command for an instant message may require a recipient and a message and may have options such as a choice of a text or a voice message.

As noted above, the verbal input is parsed by the monitoring module 130 or the processor 160, and the processor 160 is configured to determine whether all required arguments, if any, have been received from the user. If it is determined that all required arguments for a particular verbal command have been obtained, the processor 160 will send information related to the verbal command and the arguments to a communications module 180, which will create and send instructions related to executing the command to the mobile device 200 via the connection module 120. It will be understood that the communications module 180 may be a part of processor 160 or of connection module 120.

On the other hand, if it is determined that one or more required arguments associated with the command are still required, the VCM 110 is configured to request additional verbal input from the user. In particular, the VCM 110 may issue a prompt, based on an associated argument, for further verbal input. In some cases, the VCM 110 may identify verbal input comprising arguments associated with the verbal command by identifying an argument based on a predetermined set of possible responses stored at the voice-control module. For example, if there is no recipient given for an instant message or phone call command, the VCM 110 will prompt the user to specify the recipient. If the argument relates to a recipient for a communication, the VCM 110 may compare the verbal input received with a predetermined list of potential recipients and/or prompt the user based on a predetermined list of potential recipients. Prompting using the predetermined list may include reading the predetermined list to the user or a subset of the predetermined list. The use of a predetermined list of potential recipients at the VCM 110 is intended to allow for more efficient recognition of recipients and also further reduce battery use at the mobile device 200, since the mobile device 200 will not be used to provide the prompting for arguments. It will be understood that a similar approach may be used for other arguments such as subject line, message body, or the like.

The mobile device 200 further includes a monitoring module 230. The monitoring module 230 monitors for instructions from the VCM 110 via the connection module 210. The connection module 210 or monitoring module 230 of the mobile device 200 will then relay the instructions to the processor 220.

The monitoring module 230 may further monitor incoming communication to the mobile device 200. For example, when the mobile device 200 is in the intermediate mode, the monitoring module 230 may detect the receipt of a communication, for example, a phone call, a new instant message or email and then provide instructions to the VCM 110 with regard to announcing information related to the received communication.

The VCM 110 may be integrated into a vehicle or may be a stand-alone device that can be mounted to a windshield visor or otherwise be provided within the vehicle. The VCM 110 may further include a power source 190, for example, a battery. Alternatively, the VCM 110 may be powered by a power connection (not shown) to the vehicle.

The VCM 110 may be configured to receive data including audio files such as voice clips. In some cases, the user may prefer to include audio files which are intended to allow a recipient to hear the tone of the message. In some cases, the VCM 110 may include a speech-to-text module (not shown) for converting speech to text when requested or required, for example, if an application requires a text file rather than an audio file. In some other embodiments, the VCM 110 may include a video capture module for applications where video data may be communicated.

Figure 2:
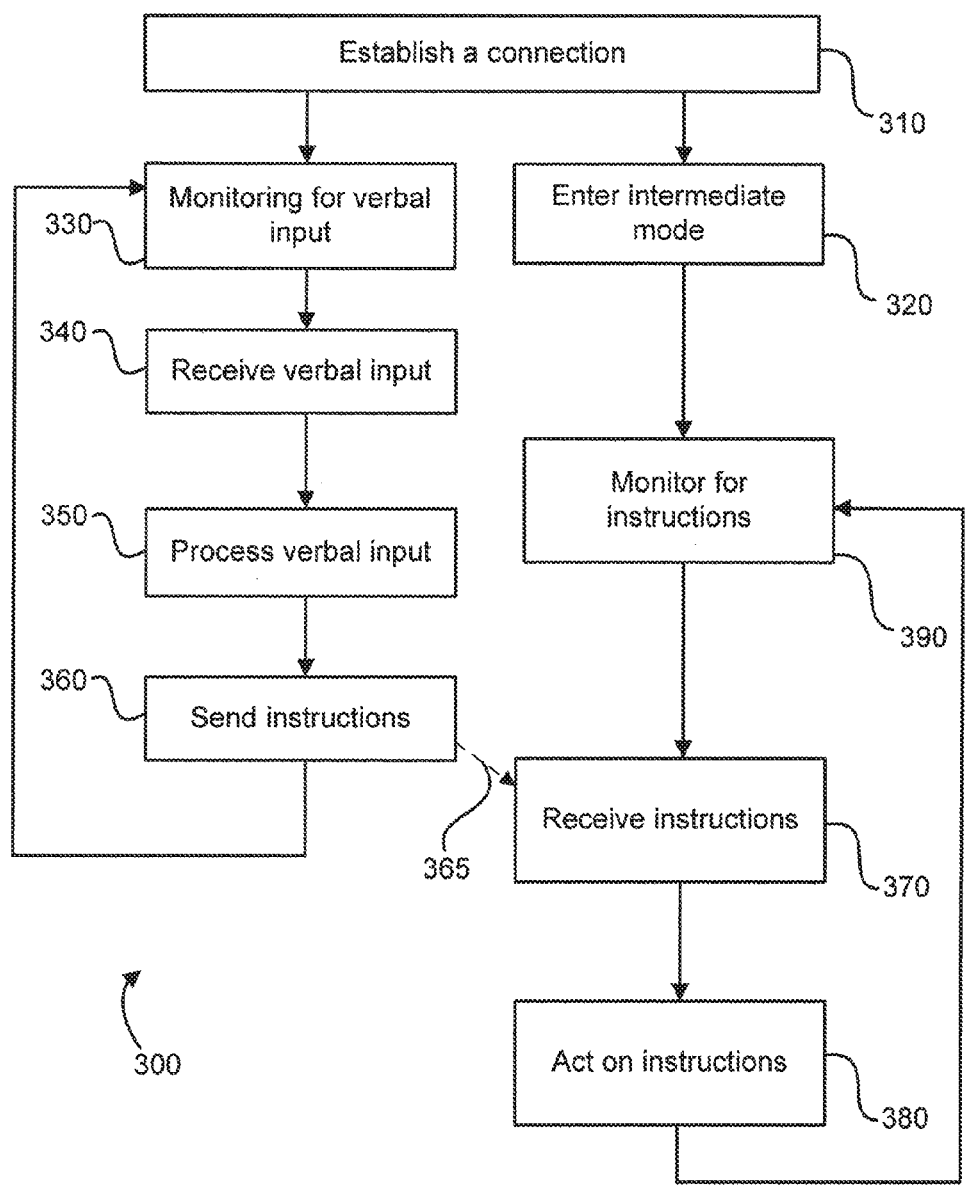
FIG. 2 is a flowchart illustrating a method for voice control.

FIG. 2 illustrates a flowchart of an embodiment of a method 300 for voice control of a mobile device. At 310, a connection 199 is established between a VCM 110 and a mobile device 200. The connection 199 may be a wired or wireless connection. In some cases, the connection 199 is a Bluetooth™ connection. At 320, the mobile device 200 enters into an intermediate mode once the connection 199 is established. The intermediate mode is as described above. At 390, when the mobile device is in intermediate mode, the mobile device 200 will monitor for instructions from the VCM 110 as well as monitor for the receipt of a communication.

At 330, the VCM 110 monitors to determine if a user issues a verbal input. In some cases, the VCM 110 may begin to monitor when the connection with the mobile device 200 is established. In other cases, the VCM 110 may begin monitoring prior to having the connection established. The connection 199 between the VCM 110 and the mobile device 200 is intended to be established when the VCM 110 and mobile device 200 are in proximity to each other, for example, when a user enters a car, and, once established, is intended to remain established even after executing instructions or commands. The connection 199 may end or be terminated either automatically (as configured) or by the user when, for example, the user exits a car or the user enters an area where hands-free communication is no longer required or preferred by the user.

At 340, the VCM 110 detects a verbal input from the user. At 350, the verbal input is parsed and processed by the VCM 110 to determine whether a command phrase has been received. In determining whether or not a command phrase has been received, the verbal input can be compared to the set of predetermined verbal commands to determine an intended command. The verbal input/command phrase can then be further parsed into a verbal command and any arguments associated with the verbal command. If the verbal input does not include a verbal command from the set of predetermined commands, typically no action is taken. However, in some embodiments, the VCM 110 may query as to whether a command is intended, provide a list of acceptable commands (sometimes referred to as a hotlist) or prompt the user to retry the verbal input. The VCM 110 may determine similar commands and may attempt to guide the user to a command from the set of predetermined commands by listing available commands or the like.

At 360, instructions, based on the command and any arguments, are sent from the VCM 110 to the mobile device 200 as shown by the dotted arrow 365. The instructions may include, for example, instructions for the mobile device 200 to launch an application appropriate for the command, such as an email application in the case of an email command.

The VCM 110 may continue to monitor for verbal input, at 330 once the instructions have been sent in order to determine whether the user is giving another or further verbal input. The VCM 110 may continue to monitor until the connection 199 between the mobile device 200 and the VCM 110 has been ended or until the user issues a command directing the VCM 110 to end the monitoring.

At 370, the mobile device 200 receives the instructions related to the command. At 380, the mobile device 200 processes the command and performs the user requested action. In general, the command is executed to complete the task requested by the user, for example sending an email, sending an instant message, or placing a phone call.

In some cases, the VCM 110 may send the instructions to the mobile device 200 in steps or stages. Once the communication application the user wishes to use is known, based on the received command phrase or verbal command, the VCM 110 may send instructions for the mobile device to launch the appropriate application. Once the VCM 110 has collected arguments associated with the command, such as a recipient of a communication, a message to be sent or the like, the VCM 110 then sends the associated arguments to the mobile device, allowing the mobile device to complete the action requested by the user of the system 100 for voice control.

At 390, after the instructions have been acted upon by the mobile device 200, the mobile device continues monitoring for instructions from the VCM 110.

Figure 3:
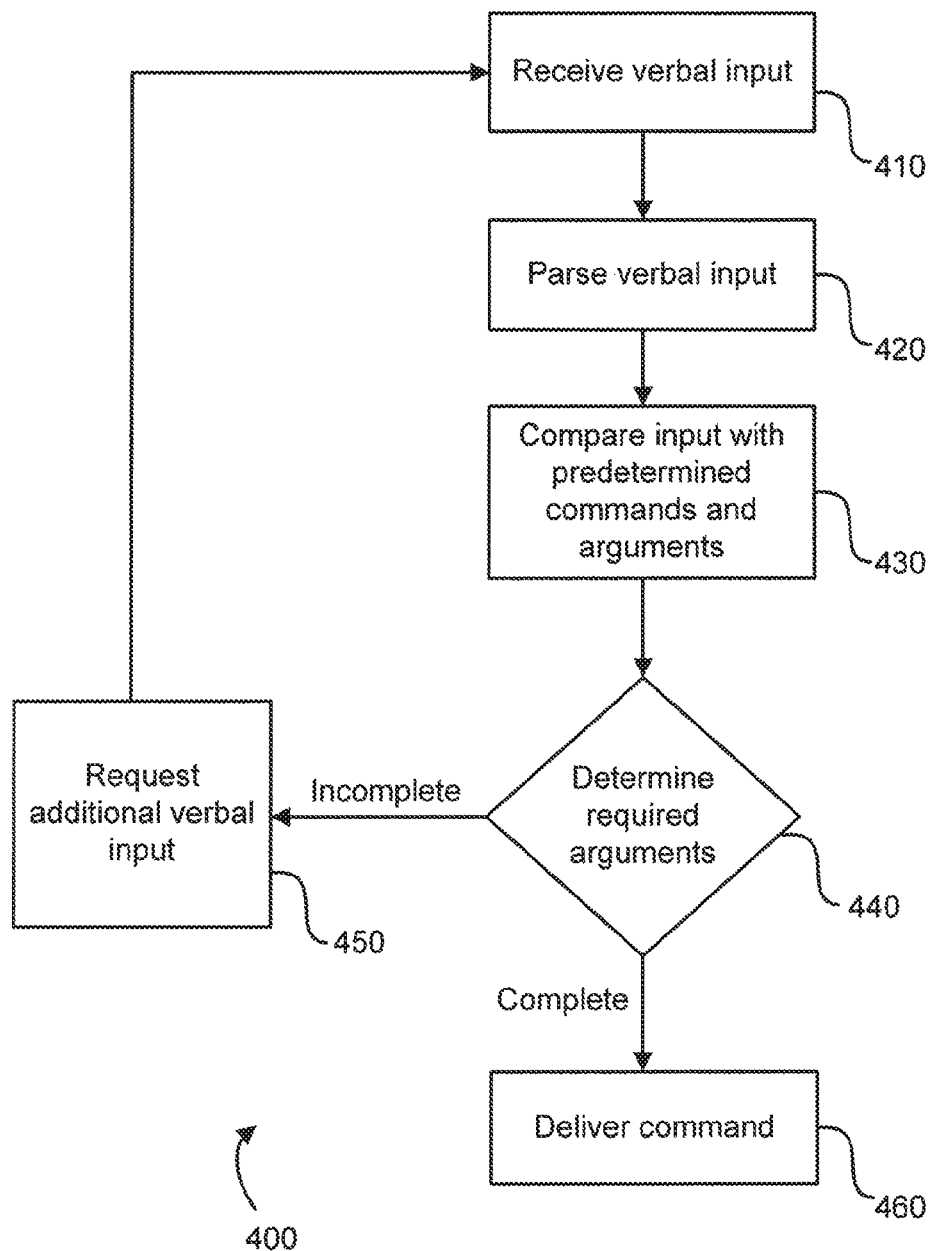
FIG. 3 is a flowchart of a method for receiving and processing a verbal command.

FIG. 3 illustrates a flow chart of an embodiment of a method 400 for receiving and processing a verbal input by the VCM 110. This method is performed by the VCM 110, typically after the VCM 110 is connected with the mobile device 200 and while the mobile device 200 remains in the intermediate mode. However, the VCM 110 may also be configured to take command phrases and store them until a connection 199 is established with the mobile device 200. At 410, the VCM 110 receives verbal input, via the microphone 140 and the monitoring module 130. At 420, the verbal input is then parsed by the VCM 110 into words.

At 430, the VCM 110 reviews and compares the verbal input to determine whether a command phrase is included in the verbal input. In particular, the VCM 110 compares the parsed verbal input against a set of predetermined verbal commands stored in the memory module 170. If a verbal command is present, the VCM 110 may also retrieve any arguments associated with the verbal command from the verbal input/command phrase. At 440, the VCM 110 further reviews the parsed verbal input to determine if all required arguments have been received for the received verbal command. At 450, if any of the required arguments associated with the command have not been received, the VCM 110 will request the user to provide further verbal input having the associated arguments. As described above, the verbal input for an argument may be compared or identified based on a set of predetermined arguments. In a specific example, if there is no recipient provided for a communication command, such as an instant message command, the VCM 110 will prompt the user to specify the recipient. In determining whether or not a recipient has been specified, the VCM 110 may compare the arguments from the command phrase with a predetermined set of potential recipients that are stored in the memory module 170.

If after prompting the user, the VCM 110 determines the required arguments are still incomplete, the VCM 110 will issue a further request for verbal input from the user, at 450. The VCM 110 will continue to request further verbal input until all the required arguments have been received or until the user stops the process by exiting or ending the method for receiving and processing a verbal input. In some embodiments, the VCM 110 may recite a list of the potential recipients or a subset of the potential recipients, such as, for example, a list of recently used recipients.

In some cases, the VCM 110 may further determine if there are optional arguments, for example, the option to include further recipients to a message or include a subject in an email, and may prompt the user to determine if the user would like to include any optional arguments with the command.

At 460, once the required arguments have been received and determined to be complete, the VCM 110 will send instructions related to the command and the associated arguments to the mobile device 200. The instructions may include a command to activate a related communication application, compose a message to the specified recipient, and the like. Once the mobile device 200 processes the instructions, the mobile device 200 remains in the intermediate mode and continues to monitor for further instructions from the VCM 110. In some cases, the VCM 110 will send initial instructions to the mobile device 200 to take an action such as opening a communication application. The mobile device 200 will active the application related to the command and wait for secondary instructions with respect to the command to be performed and/or the arguments that are required.

Figure 4:
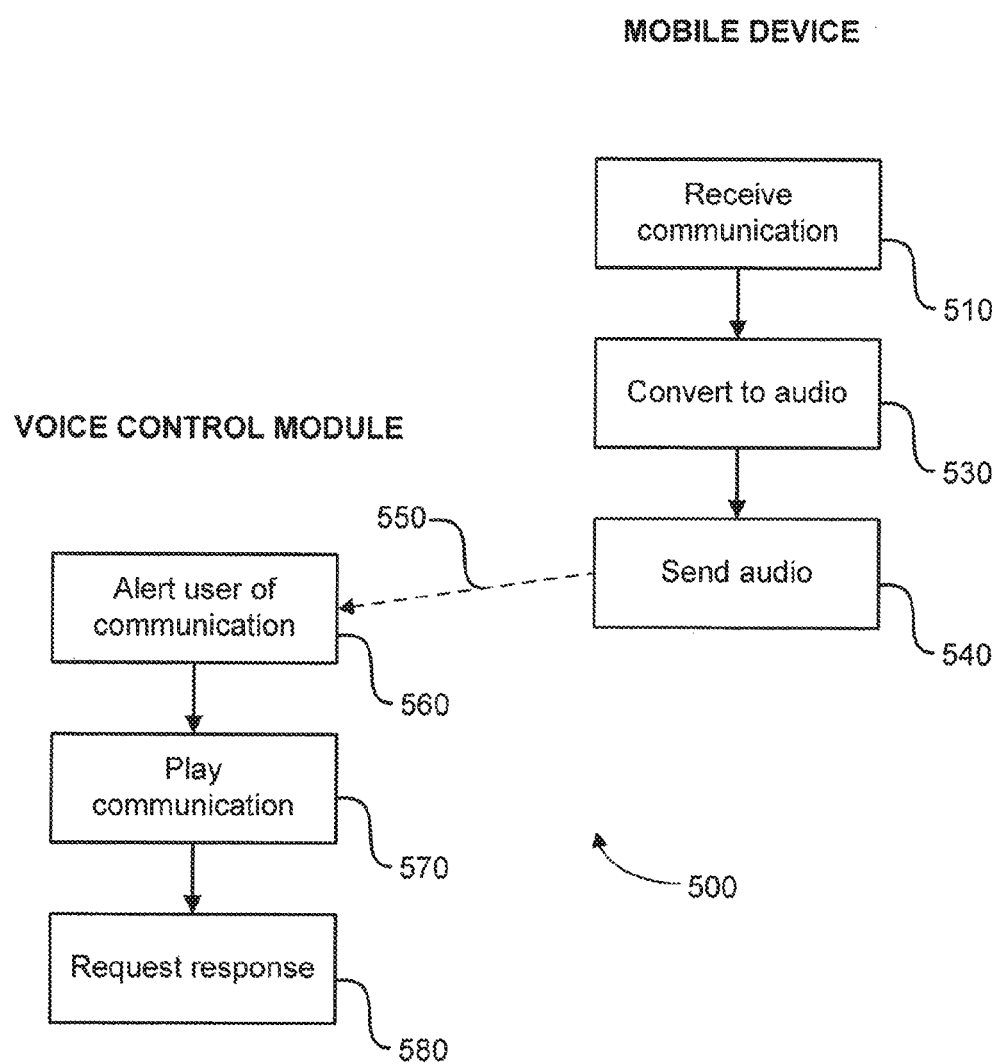
FIG. 4 is a flowchart of a method for receiving communication with the system for voice control.

FIG. 4 illustrates a flow chart of an embodiment of a method 500 for receiving a communication with the system 100 for voice control. At 510, a communication, for example, a phone call, an email, a meeting reminder, an instant message or the like, is received by the mobile device 200. In one case (as illustrated), the VCM 110 may act as a conduit for the communication. In this case, at 530, the communication is converted to audio at the mobile device. For example, the text of an email or instant message, or the details such as the phone number and caller identification, may be converted to audio. At 540, the mobile device then sends the audio to the VCM 110. The audio is transmitted to the VCM 110 as illustrated by the dotted arrow 550. In other cases, the VCM 110 may act as a processor such that the communication may be sent digitally from the mobile device 200 and the VCM 110 may convert the communication to audio in order to play the communication to the user of the system 100 for voice control. Following the playing of the communication, the VCM 110 may ask the user if there is a response, which would then be handled in a similar way to a new message but the recipient would be known and not needed as an associated argument to the command.

At 560, once the VCM 110 receives the communication, the VCM 110 will alert the user of the communication. At 570, the user may select to receive the communication, in which case the VCM 110 plays the communication and may further relay details regarding the communication. In some cases, the user may choose to ignore or cancel the alert, in which case the VCM 110 will not play the communication or other details At 580, after playing the communication, the VCM 110 may request a response from the user. For example, if the communication was an email or instant message, the VCM 110 may ask the user if there is a response, such as a reply email or message. The request for a response may vary depending on the type of communication received. In general, a response would then be handled in a similar way to a new message but the recipient would be known and not needed as an argument.

Figure 5:
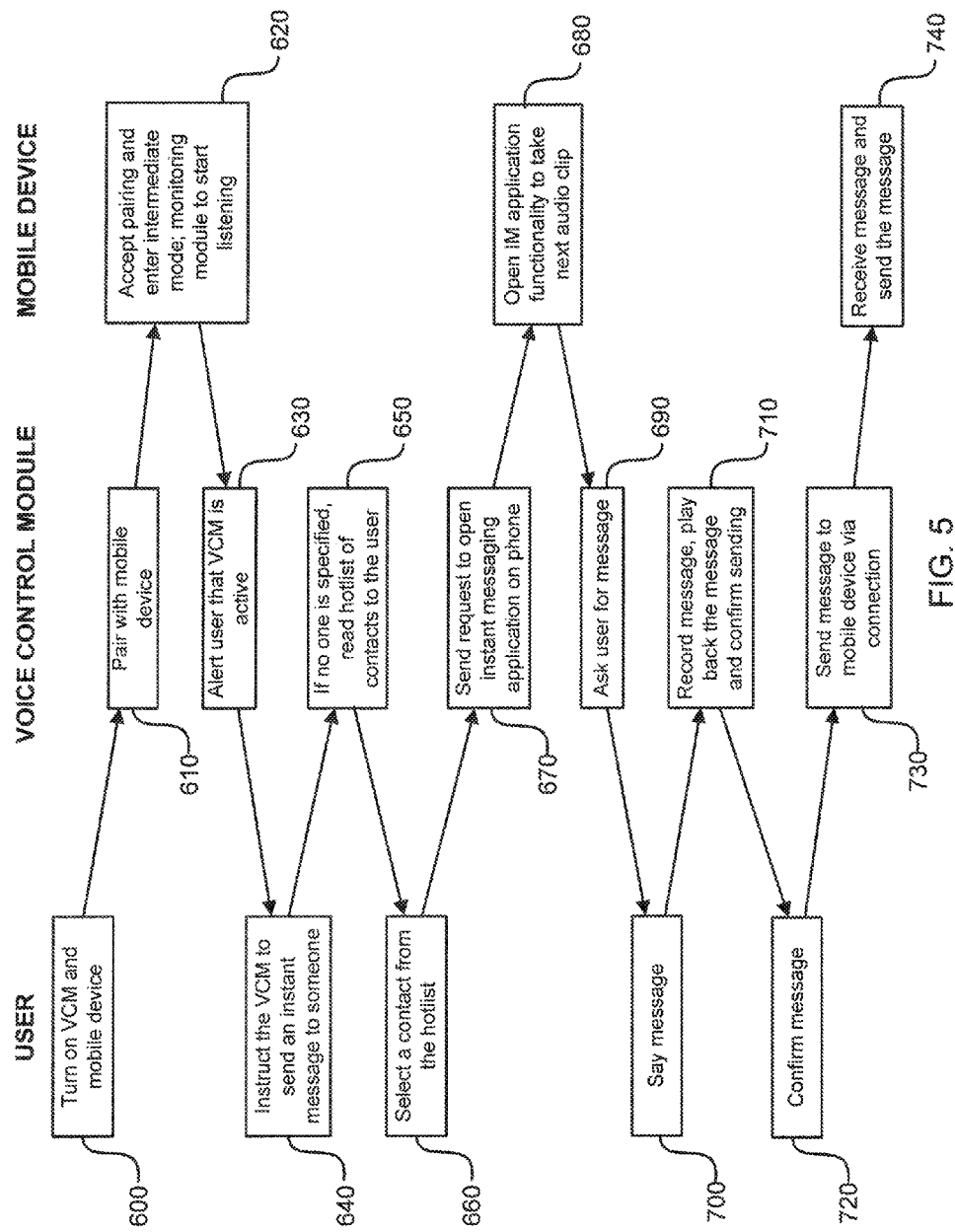
FIG. 5 is a use-case diagram of sending an instant message with the system for voice control.

FIG. 5 illustrates an example use-case diagram of sending an instant message using the system 100 for voice control. At 600, the user begins by turning on the system 100 for voice control, including the VCM 110 and mobile device 200. At 610, the VCM 110 pairs with the mobile device 200. At 620, the mobile device 200 accepts the pairing and enters an intermediate mode. When in this intermediate mode, the mobile device activates a monitoring module 230 that listens for messages from the VCM 110. During the intermediate mode, the mobile device 200 may further disable one or more predetermined functions, for example, the mobile device may disable one or more connections to networks, such as Wi-Fi, or may cease listening for voice commands.

At 630, once paired, the VCM 110 may alert the user that the pairing is complete and that the VCM 110 is active. In some cases, this alert may include turning on an LED or playing an audible noise. Once the VCM 110 is active, it continues listening for verbal input. In some cases, the VCM may further ask the user to give a command.

The VCM 110 monitors for verbal input. At 640, the user issues verbal input that is parsed to determine a command phrase. On receipt of the command phrase, the VCM 110 reviews the command phrase to determine a verbal command. The VCM 110 determines if a verbal command selected from a set of predetermined commands is received, for example, a command related to a communication application. In this example, the user issues verbal input such as "send instant message". This represents a verbal command. The VCM 110 also parses the command phrase to determine any arguments associated with the command. At 650, as no recipient was specified by the user, the VCM 110 may request the user to name a recipient or may read to the user a hotlist of contacts that may be stored in the memory module 170. The hotlist may be updated by the user or may be synchronized with contacts in the user's address book on the mobile device or the like. The hotlist may change depending on the application or communication method used by the user. In some cases, the user may have contacts on an e-mail hotlist that do not appear on the user's hotlist for instant messaging and/or the user's hotlist for phone calls. In the case of an instant messaging application, for example, the hotlist may contain recipients the user has previously contacted, recipients that currently have open conversations with the user when the mobile device paired with the VCM 110, or previously determined recipients the user has selected. In some cases, the hotlist may contain group contacts where a user can select a group contact instead of selecting several individuals separately.

At 660, the user selects a recipient. At 670, the VCM 110 instructs the mobile device 200 to open the instant message application. At 680, the mobile device activates the application, the mobile device 200 signals the VCM 110 to indicate the mobile device's readiness to accept the next data stream, for example, an audio clip.

At 690, the VCM 110 may then ask the user for a message. At 700, the user states the message. At 710, the VCM records the message and may play back the message to the user and confirm the sending of the message to the specified recipient. At 720, the user confirms the message. At 730, the VCM 110 then sends the message to the mobile device 200. The message may be an audio clip or may be converted to text by either the VCM 110 or the mobile device 200. At 740, the mobile device 200 receives the message and sends the message to the appropriate recipient.

Figure 6:
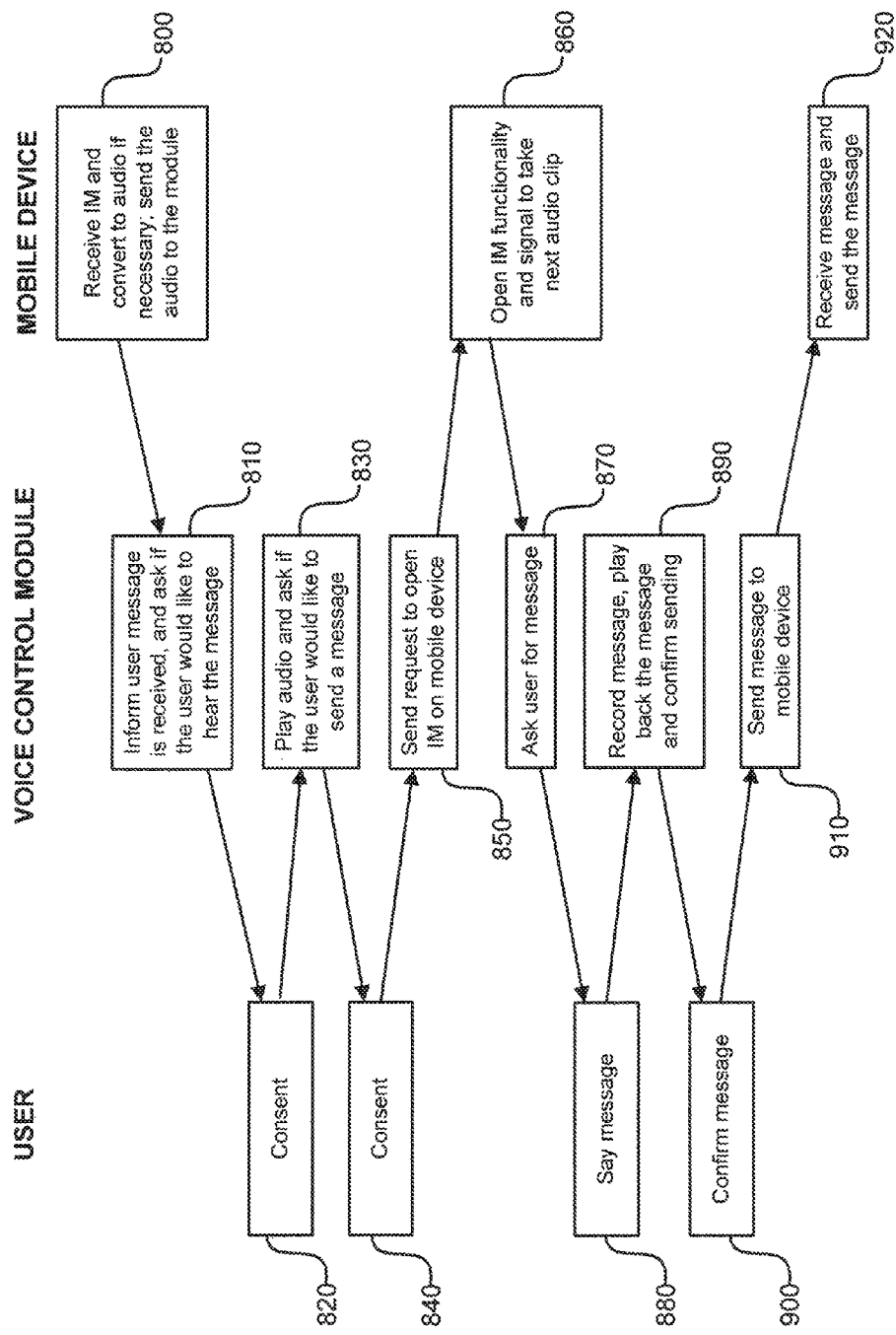
FIG. 6 is a use-case diagram of receiving an instant message with the system for voice control.

FIG. 6 illustrates an example use-case diagram of receiving an instant message via the system 100 for voice control. At 800, the mobile device 200 receives an instant message. The mobile device 200 converts the received message to audio if necessary and sends the audio to the VCM 110. In some cases, the mobile device 200 may send the message to the VCM 110 and the VCM 110 may convert the message into audio to play to the user.

At 810, the VCM 110 will inform the user that an instant message has been received and ask if the user would like to hear the message. At 820, the user consents. At 830, the VCM 110 plays the audio to the user. If the user does not consent the VCM 110 will not play the message and will resume monitoring for verbal input from the user or further input from the mobile device 200.

If the VCM 110 plays the audio, the VCM 110 may then ask if the user wishes to respond to the instant message. If the user does not wish to respond, the VCM 110 returns to a monitoring state. At 840, the user indicates that he wishes to respond. At 850, the VCM 110 sends a request to the mobile device 200 to open the instant messaging application. At 860, the mobile device 200 will open the corresponding application and signal to the VCM 110 that the mobile device 200 is ready to receive the next instructions.

At 870, the VCM 110 may ask the user for the message. At 880, the user commences the message. In some cases, the user may commence the message without prompting from the VCM. At 890, the VCM 110 records the message and may play back the message to the user and confirm the sending of the instant message. The VCM 110 may further transcribe the voice message to a text message, if the user prefers to send a text message and not an audio clip. At 900, the user confirms the message. At 910, the VCM 110 sends the message to the mobile device 200. At 920, the mobile device 200 receives the message and sends the instant message to the appropriate recipient. In some cases, the mobile device 200 may transcribe the audio message to text to send the message as a text message in the instant messaging application.

Although the above examples detail the use of the system 100 for voice control with respect to instant messaging, it will be understood that the system 100 for voice control may be used with other communication applications, such as e-mail, SMS, MMS, telephone, or the like.

In a further example, the system 100 for voice control may be used for speed dialing contacts. The numbers for individual contacts may be included in a hotlist of contacts stored in the memory module 170 of the VCM 110. If a user wishes to phone a contact the user can specify a contact on the hotlist and the VCM 110 can proceed to send instructions to the mobile device with the information associated with the contact in the hotlist. If multiple contacts contain the same name, the VCM 110 may determine which contact is the most contacted and ask the user if this contact is the correct person. If not the VCM 110 may continue through the list with the same name to determine the correct person or the user may specify further detail in order to narrow the matching contacts. Once the contact is determined, the associated contact entry on the hotlist may contain multiple phone numbers, the VCM 110 may determine which number is the most contacted and ask the user if this phone number is the correct number to call. If this is the incorrect number the VCM 110 may continue through the list of associated phone numbers to determine the correct phone number. In some cases, the VCM 110 may prompt the user to select the correct number from the multiple phone numbers. For example, the user may request to phone a home number or a business number for a specific contact.

Further, the systems and methods herein may also be adapted for other applications, for example, the mobile device may include a map application or the mobile device may be a GPS device and the VCM 110 may include the ability to provide the user with, for example, road conditions, traffic conditions, alternate routes either when the VCM 110 is alerted to specific conditions or on request by the user.

In the preceding description, for purposes of explanation, numerous details are set forth in order to provide a thorough understanding of the embodiments. However, it will be apparent to one skilled in the art that these specific details are not required. In other instances, well-known structures and elements may be shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for voice control of a mobile device, the method comprising:
    establishing a connection between the mobile device and a voice-control module;
    responsive to establishing the connection, the mobile device entering into an intermediate mode;
    the voice-control module monitoring for verbal input comprising a verbal command from among a set of predetermined verbal commands;
    upon receiving a verbal command from among the set of predetermined verbal commands, the voice-control module sending instructions to the mobile device related to the verbal command received; and
    the mobile device performing an action based on the received instructions at the mobile device;
    wherein the mobile device entering the intermediate mode comprises disabling at least some predetermined functionality of the mobile device, wherein the disabling is performed in the absence of a command received from the voice-control module.

2. The method of claim 1, wherein the at least some predetermined functionality comprises communication of the mobile device over one or more predetermined networks.

3. The method of claim 1, wherein the at least some predetermined functionality comprises the mobile device monitoring for verbal commands.

4. The method of claim 1, wherein the set of predetermined verbal commands comprises verbal commands corresponding to communication applications.

5. The method of claim 1, wherein monitoring at the voice-control module for verbal input comprising a verbal command further comprises monitoring at the voice-control module for verbal input comprising arguments associated with the verbal command.

6. The method of claim 5, further comprising issuing a prompt, based on an associated argument, for further verbal input at the voice-control module, if the associated argument is a required argument and has not been received.

7. The method of claim 5, wherein, monitoring at the voice-control module for verbal input comprising arguments associated with the verbal command comprises identifying an argument based on a predetermined set of possible responses stored at the voice-control module.

8. The method of claim 1, wherein the mobile device performing an action based on the received instructions at the mobile device comprises activating an application related to the verbal command.

9. The method of claim 8, wherein the mobile device performing an action based on the received instructions at the mobile device further comprises performing an action via the application, based on the verbal command.

10. A non-transitory computer readable medium comprising computer readable code that, when executed on a computer device, performs the method of claim 1.

11. A mobile device comprising:
    a connection module configured for establishing a connection between the mobile device and a voice-control module (VCM);
    a mode-setting module configured to cause the mobile device to enter an intermediate mode, responsive to establishing the connection;
    a monitoring module configured for monitoring for instructions received from the VCM; and
    a processing module configured for executing the received instructions at the mobile device;
    wherein mode-setting module configured to cause the mobile device to enter an intermediate mode comprises causing the mobile device to disable at least some predetermined functionality of the mobile device, wherein the disabling is performed in the absence of a command received from the VCM.

12. The mobile device of claim 11, wherein the at least some predetermined functionality comprises communication of the mobile device over one or more predetermined networks.

13. The mobile device of claim 11, wherein the processing module is configured for executing the received instructions by activating an application related to a verbal command recognized by the VCM and performing an action via the application, based on the verbal command.

* * * * *